(12) United States Patent
Ochiai (10) Patent No.: US 9,769,447 B2
(45) Date of Patent: Sep. 19, 2017

(54) COLOR SIGNAL PROCESSING DEVICE AND COLOR SIGNAL PROCESSING METHOD

(71) Applicant: MegaChips Corporation, Osaka (JP)

(72) Inventor: Kazunori Ochiai, Chiba (JP)

(73) Assignee: MegaChips Corporation, Osaka (JP)

( * ) Notice: Subject to any disclaimer, the term of this patent is extended or adjusted under 35 U.S.C. 154(b) by 0 days.

(21) Appl. No.: 14/959,907

(22) Filed: Dec. 4, 2015

(65) Prior Publication Data

US 2016/0165201 A1    Jun. 9, 2016

(30) Foreign Application Priority Data

Dec. 5, 2014  (JP) .................................. 2014-246565

(51) Int. Cl.
*H04N 9/64* (2006.01)
*H04N 9/67* (2006.01)
*G09G 3/20* (2006.01)

(52) U.S. Cl.
CPC ............ *H04N 9/67* (2013.01); *G09G 3/2003* (2013.01); *G09G 2320/0276* (2013.01); *G09G 2340/06* (2013.01)

(58) Field of Classification Search
CPC .. H04N 9/64; H04N 9/67; H04N 9/77; G09G 2340/06; G09G 5/02
USPC ........ 348/571, 582, 617, 621, 659; 345/690, 345/600–604; 382/162, 167; 358/518, 358/519, 523, 525
See application file for complete search history.

(56) References Cited

U.S. PATENT DOCUMENTS 5,987,167 A  *  11/1999  Inoue .................... G06T 11/001
                                                                358/518
2011/0249040 A1    10/2011  Hiraki

FOREIGN PATENT DOCUMENTS

| JP | H04-21191 A | 1/1992 |
| JP | 2006-013968 A | 1/2006 |
| JP | 2011-223467 A | 11/2011 |

* cited by examiner

*Primary Examiner* — Paulos M Natnael
*Assistant Examiner* — Jean W Desir
(74) *Attorney, Agent, or Firm* — Osha Liang LLP (57) ABSTRACT

A color signal processing device can correct color phase distortion for each luminance value by using a small-capacity memory and in a circuit configuration having a small chip area and low power consumption. The present invention relates to a color signal processing device including a matrix coefficient storage section that stores a plurality of first matrix coefficients corresponding to a plurality of evaluation values set in advance and a predetermined offset value, an evaluation value calculation section that calculates a predetermined evaluation value based on each of a plurality of color component signals contained in a first color signal, a matrix coefficient interpolation operation section that generates a second matrix coefficient based on the predetermined evaluation value calculated by the evaluation value calculation section and the plurality of first matrix coefficients, a matrix operation section that performs an operation based on each of the color component signals in the first color signal and the second matrix coefficient to generate a second color signal containing a plurality of color component signals, and an offset operation section that performs an operation based on the predetermined offset values and the second color signal.

14 Claims, 5 Drawing Sheets

IDEAL STATE

*Fig.3B*

BEFORE OFFSET OPERATION

*Fig.3C*

AMOUNT OF OFFSET

*Fig.3D*

AFTER OFFSET OPERATION

COLOR SIGNAL PROCESSING DEVICE AND COLOR SIGNAL PROCESSING METHOD

FIELD OF THE INVENTION

The present invention generally relates to a color or luminance signal processing technology, and particularly to a color signal processing device and a color signal processing method for performing color conversion based on linear matrix conversion.

BACKGROUND OF THE INVENTION

As an image output device, there may be, for example, known image display device, such as a display including a liquid crystal panel, an organic electroluminescence panel, or any other type of display panel, and image printing device, such as an inkjet printer, a laser printer, and an LED printer. An image output device of this type may output an image in accordance with an externally transmitted signal carrying chromaticity specified based on the NTSC method, the sRGB method, the CMYK method, or any other standard or method but actually output the image by using chromaticity according to the characteristics specific to the image output device. The image output device may therefore actually display an image by using chromaticity different from the chromaticity carried by the externally transmitted signal. To regenerate the original chromaticity carried by the externally transmitted signal, there may be a known technology called linear matrix conversion, in accordance with which the signal is corrected.

For example, Japanese Patent Publication No. 2011-223467 discloses a color signal processing device that may perform linear matrix conversion in which an RGB signal is multiplied by a 3×3 matrix coefficient. The color signal processing device may include an approximate coefficient storage section that stores approximate coefficients of each approximate equation, a matrix coefficient calculation section that substitutes the value of a first color in an inputted RGB signal into an approximate equation expressed by the approximate coefficients read from the approximate coefficient storage section to calculate a 3×3 matrix coefficient according to the inputted RGB signal, and a conversion section that multiplies the inputted RGB signal by the matrix coefficient calculated by the matrix coefficient calculation section and outputs the color-converted RGB signal. The approximate equation may determine an approximate value of the matrix coefficient and have a variable that is the value of the first color of the three primary colors R, G, and B.

Further, for example, Japanese Patent Publication No. 2006-013968 discloses a color conversion device that may perform color conversion on an inputted color signal formed of five or more color components. The color conversion device may include coefficient storage means for storing a matrix conversion coefficient and operation means for reading the matrix conversion coefficient stored in the coefficient storage means to perform matrix operation and performing color conversion on the inputted color signal. The operation means may perform the matrix operation in consideration of a correlated element relating to color components that interact with each other among the color components described above.

To regenerate the original chromaticity carried by an externally transmitted signal, there may be a known technology for correcting the signal more precisely by using a three-dimensional lookup table.

For example, Japanese Patent Publication No. H4-21191 discloses a color conversion device using a three-dimensional lookup table. The color conversion device may include division means for receiving a set of three-dimensional color signals, four-dimensional color signals, or color signals having a dimension of a higher degree and dividing each of the color signals into an upper-level signal and a lower-level signal with the numbers of bits of the two signals different from each other, a table memory for storing color conversion values selected by the upper-level signals, weight coefficient provision means for providing values of weight coefficient selected by the lower-level signals, unit tetrahedron selection means for selecting a unit tetrahedron to which the color signal belongs from a plurality of unit tetrahedrons obtained by dividing a unit cuboid in a color space determined by the upper-level signals, and operation means for performing three-dimensional interpolation, four-dimensional interpolation, or interpolation of a dimension of a higher degree on the color space based on color conversion values and the weight coefficient values at four vertices of the unit tetrahedron.

SUMMARY OF THE INVENTION

In general, an image output device may have a reproducible chromaticity range that varies with luminance and hence have color phase distortion that varies for each luminance value. For example, an image output device having a liquid crystal panel may be characterized by what is called luminance leakage or leakage of light through the liquid crystal panel out of the front surface thereof in black display operation, and the luminance leakage may cause an image output device having a liquid crystal panel to display an image with a more distorted color phase at lower luminance. Further, for example, an image output device, such as a CMYK printer, may show a characteristic called a dot gain in which an image having brightness lower than expected brightness is outputted. An image output device, such as a printer, of this type may therefore output an image with a more distorted color phase at luminance closer to an intermediate value. Since the color phase distortion that varies for each luminance value described above gives a user of the image output device a visually unfavorable result, how well the color phase distortion that varies for each luminance value is corrected is important for an image output device.

The color signal processing device of related art disclosed in Japanese Patent Publication No. 2011-223467 may improve color phase distortion described above by changing the matrix coefficient for each luminance value in a specific color but may not correct the color phase distortion due to changes in luminance in all colors.

The color conversion device of related art disclosed in Japanese Patent Publication No. 2006-013968 may precisely correct color phase distortion for an inputted color signal formed of five or more color components but may not correct color phase distortion for an inputted color signal formed of four or less color components or color phase distortion due to a change in luminance.

The color conversion device of related art disclosed in Japanese Patent Publication No. H4-21191 may correct color phase distortion due to a change in luminance in each of the RGB colors in an image output device but may require a large-capacity memory that allows use of a three-dimensional lookup table, undesirably resulting in an increase in power consumption due to implementation of a large-capacity memory and an increase in chip area for implementation of the large-capacity memory.

An object of the present invention is to provide a color signal processing device capable of correcting color phase distortion for each luminance value in each color.

Another object of the present invention is to provide a color signal processing device capable of correcting color phase distortion by using a small-capacity memory and in a circuit configuration having a small chip area and low power consumption.

The present invention for achieving the objects described above may include the following technical features or invention identifying items.

That is, the present invention according to an aspect may be a color signal processing device. The color signal processing device may comprise a matrix coefficient storage section that stores a plurality of first matrix coefficients corresponding to a plurality of evaluation values set in advance and a predetermined offset value relating to an output characteristic, an evaluation value calculation section that calculates a predetermined evaluation value based on each of a plurality of color component signals contained in a first color signal, a matrix coefficient interpolation operation section that generates a second matrix coefficient based on the predetermined evaluation value calculated by the evaluation value calculation section and the plurality of first matrix coefficients, a matrix operation section that performs an operation based on each of the color component signals in the first color signal and the second matrix coefficient to generate a second color signal containing a plurality of color component signals, and an offset operation section that performs an operation based on the predetermined offset value and the second color signal.

By this configuration, the color signal processing device may generate the second matrix coefficient based on the first matrix coefficients corresponding to a plurality of evaluation values set in advance and the evaluation values calculated based on the color component signals in the first color signal, generate the second color signal by multiplying the color component signals in the first color signal by the generated second matrix coefficient, and add predetermined offset values relating to the output characteristic to the second color signal to cancel a luminance leakage characteristic, whereby color phase distortion can be corrected by using a small-capacity memory for storing the first matrix coefficients corresponding to the plurality of evaluation values and the predetermined offset values relating to the output characteristic and in a circuit configuration having a small chip area and low power consumption.

The color signal processing device may further include an inverse gamma correction section that performs inverse gamma correction on a color signal outputted from a video processing device to generate the first color signal and a gamma correction section that performs gamma correction on the second color signal on which the operation has performed.

By this configuration, the color signal processing device may perform inverse gamma correction on the color signal outputted from the video processing device, perform gamma correction on the second color signal, and output an output signal, whereby color phase distortion can be corrected even when gamma correction is performed on the color signal.

The evaluation value calculation section may calculate the evaluation value based on a signal level of a color component signal having a highest signal level in the first color signal.

The thus configured color signal processing device may calculate the evaluation value based on the signal level of a color component signal having the highest signal level in the first color signal (i.e., luminance of first color signal), whereby color phase distortion can be corrected for each luminance value.

The color signal processing device may further include an output section that outputs an image based on the second color signal having undergone the gamma correction.

The matrix coefficient interpolation operation section may select, from among the plurality of first matrix coefficients, a specific first matrix coefficient which corresponds to the predetermined evaluation value calculated by the evaluation value calculation section as the second matrix coefficient.

The color signal processing device may thus select the first matrix coefficient corresponding to the predetermined evaluation value as the second matrix coefficient, whereby the matrix coefficient interpolation operation section can be simply configured.

The matrix coefficient interpolation operation section may generate the second matrix coefficient based on specific first matrix coefficients among the plurality of first matrix coefficients, the specific first matrix coefficients corresponding to a plurality of evaluation values associated to the predetermined evaluation value calculated by the evaluation value calculation section.

The thus configured color signal processing device can reduce the number of first matrix coefficients stored in the matrix coefficient storage section by producing the second matrix coefficient based on first matrix coefficients corresponding to a plurality of evaluation values related to the predetermined evaluation value, whereby color phase distortion can be corrected by using a smaller-capacity memory and in a circuit configuration having a smaller chip area and lower power consumption.

Further, the matrix coefficient interpolation operation section may generate the second matrix coefficient by performing linear interpolation on specific first matrix coefficients among the plurality of first matrix coefficients, the specific matrix coefficients corresponding to a plurality of evaluation values associated to the predetermined evaluation value calculated by the evaluation value calculation section.

The thus configured color signal processing device may use linear interpolation to generate the second matrix coefficient, and the matrix coefficient interpolation operation section can therefore be simply configured.

Further, the present invention according to another aspect is a method for processing a color signal in a color signal processing device. The method may include storing a plurality of first matrix coefficients corresponding to a plurality of evaluation values in a matrix coefficient storage section in advance, calculating a predetermined evaluation value based on each of a plurality of color component signals contained in a first color signal, generating a second matrix coefficient based on the calculated predetermined evaluation value and the first matrix coefficients, and performing an operation based on the first color signal and the second matrix coefficient to generate a second color signal containing a plurality of color component signals.

The thus configured color signal processing device may generate the second matrix coefficient based on the first matrix coefficients corresponding to a plurality of evaluation values set in advance and the evaluation values calculated based on the color component signals in the first color signal and generate the second color signal by multiplying the color component signals in the first color signal by the generated second matrix coefficient, whereby color phase distortion can be corrected by using a small-capacity memory for storing only the first matrix coefficients corresponding to the plurality of evaluation values and in a circuit configuration having a small chip area and low power consumption.

According to the present invention, the color signal processing device may correct color phase distortion for each luminance value in each color.

Further, according to the present invention, the color signal processing device can correct color phase distortion by using a small-capacity memory and in a circuit configuration having a small chip area and low power consumption.

Other technical features, purposes, and advantageous effects as well as advantages of the present invention will be apparent from the following embodiment described with reference to the accompanying drawings.

DETAILED DESCRIPTION OF THE PREFERRED EMBODIMENT

An embodiment of the present invention will next be described with reference to the drawings.

Figure 1:
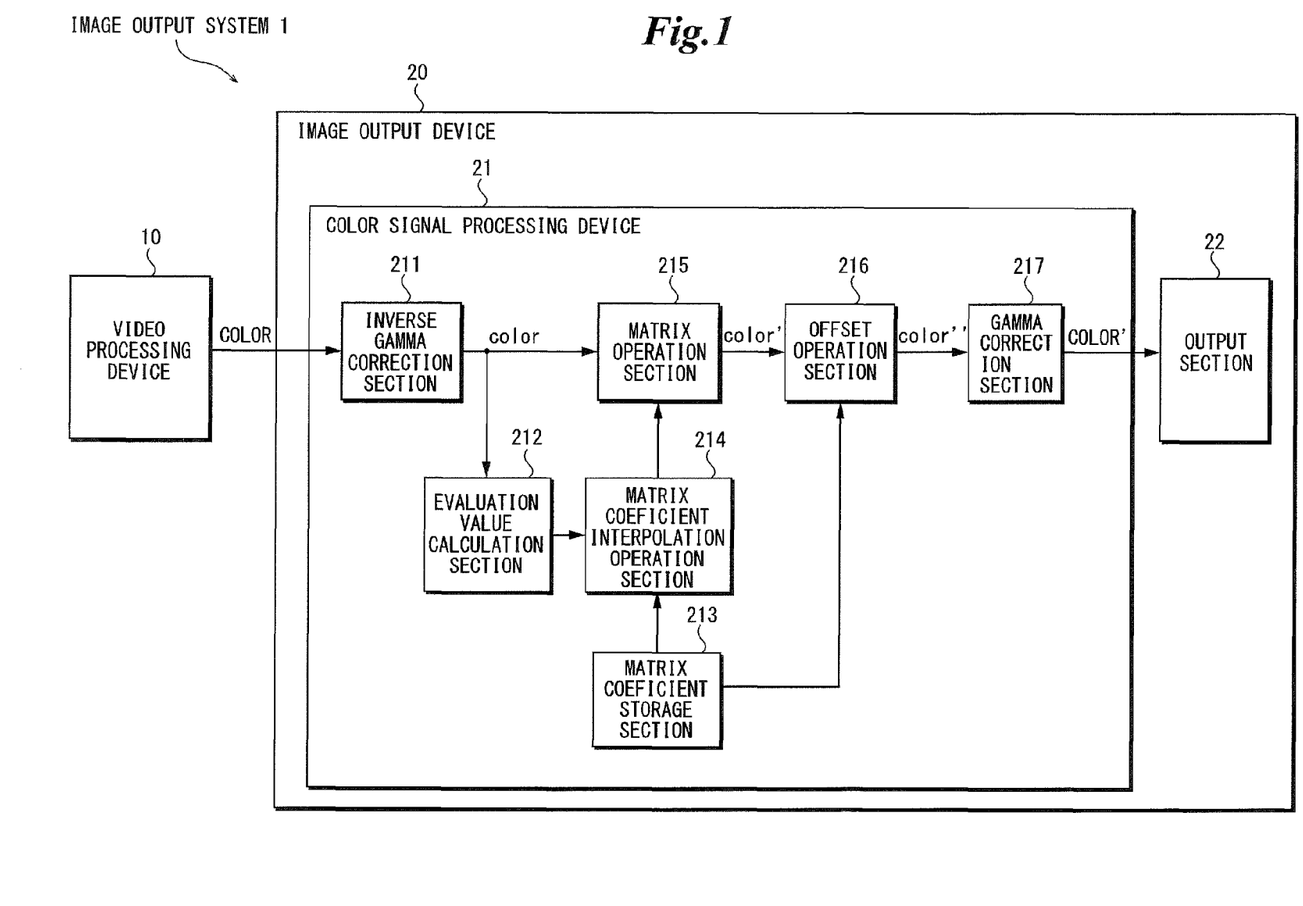
FIG. 1 shows an example of a schematic configuration of an image output system according to an embodiment of the present invention.

FIG. 1 shows an example of a schematic configuration of an image output system according to an embodiment of the present invention. An image output system 1 according to the present embodiment may include, for example, a video processing device 10 and an image output device 20, as shown in FIG. 1.

The video processing device 10 may, for example, be a personal computer, a set top box, or a control board generate a color signal COLOR according to the NTSC method, the sRGB method the CMYK method, or any other standard or method, and transmit the color signal COLOR to the image output device 20. The color signal COLOR may be, but not limited to, a general name of the following three color component signals: a red component signal having information on a red component; a blue component signal having information on a blue component; and a green component signal having information on a green component. For example, the color signal COLOR may instead include a color component signal having information on another color component, such as a cyan component signal having information on a cyan component, a magenta component signal having information on a magenta component, a yellow component signal having information on a yellow component, and a key plate component signal having information on a black component. In the following description, the color signal COLOR may be assumed to be an RGB color signal.

In general, the chromaticity is an index indicating the mixture ratio among colors in light, and the greater the chromaticity, the greater the amount of corresponding color contained in the light. Lightness is an index indicating the brightness of a color, and in an HSV (hue-saturation-value) color space, for example, the lightness refers to the chromaticity of a signal having the greatest chromaticity among signals of the colors, and in an HLS (hue-lightness-saturation) color space, the lightness refers to the average of the chromaticity of a signal having the greatest chromaticity and the chromaticity of a signal having the smallest chromaticity among signals of the colors. Luminance is an index indicating the degree of brightness sensed by a person in a color and is determined based on the chromaticity of each of the signals of the colors. Specifically, according to ITU-R BT. 609, which is a standard for standard television broadcasting standardized by International Telecommunication Union (ITU), it is known that the luminance is determined based on the following Numerical Formula 1:

(Luminance)=0.299×(red chromaticity)+0.587×(green chromaticity)+0.114×(blue chromaticity)      [Formula 1]

The luminance is related to the lightness, as shown in Formula 1.

The image output device 20 may, for example, be a display, a projector, or a printer. The image output device 20 may include, for example, a color signal processing device 21 and an output section 22.

The color signal processing device 21 may perform chromaticity conversion on the color signal COLOR transmitted from the video processing device 10 in accordance with the characteristics of the image output device 20 in such a way that the image output device 20 outputs a color that follows as faithfully as possible information on the chromaticity carried by the color signal COLOR. Specifically, the color signal processing device 21 may first calculate, based on the color signal COLOR, evaluation values VAL of the color signals therein and determine 3×3 matrix coefficients based on the calculated evaluation values VAL. The color signal processing device 21 may further multiply the signals in the color signal COLOR by the determined 3×3 matrix coefficients to generate an output signal COLOR' and outputs the output signal COLOR', which has undergone the chromaticity conversion, to the output section 22. Action of each component of the color signal processing device 21 will be described in detail with reference to FIG. 2. Each of the evaluation values VAL may, for example, be lightness or luminance in the HSV or HLS color space but is not limited thereto and may be a value based on any other index or may be any value derived from a color component signal.

The output section 22 may, for example, be a liquid crystal display panel, a plasma display panel, an organic electroluminescence display panel, or a printing head but is not limited thereto. The output section 22 may receive the output signal COLOR', which has chromaticity having been converted by the color signal processing device 21 in accordance with the characteristics of the image output device 20, and output an image according to the signal. In the present example, the output section 22 may be provided in the image output device 20, but the present invention is not necessarily configured this way. The output section 22 may instead be provided as a section separate from the image output device 20.

The thus configured image output system 1 may perform chromaticity conversion on the color signal COLOR transmitted from the video processing device 10 in accordance with the characteristics of the image output device 20 and output an image according to the output signal COLOR' having undergone the chromaticity conversion. The image output system 1, which uses the evaluation values VAL of the color signal COLOR and a 3×3 matrix coefficient prepared for each of the evaluation values VAL, can correct color phase distortion for each luminance value by using a small-capacity memory and in a circuit configuration having a small chip area and low power consumption.

Figure 2:
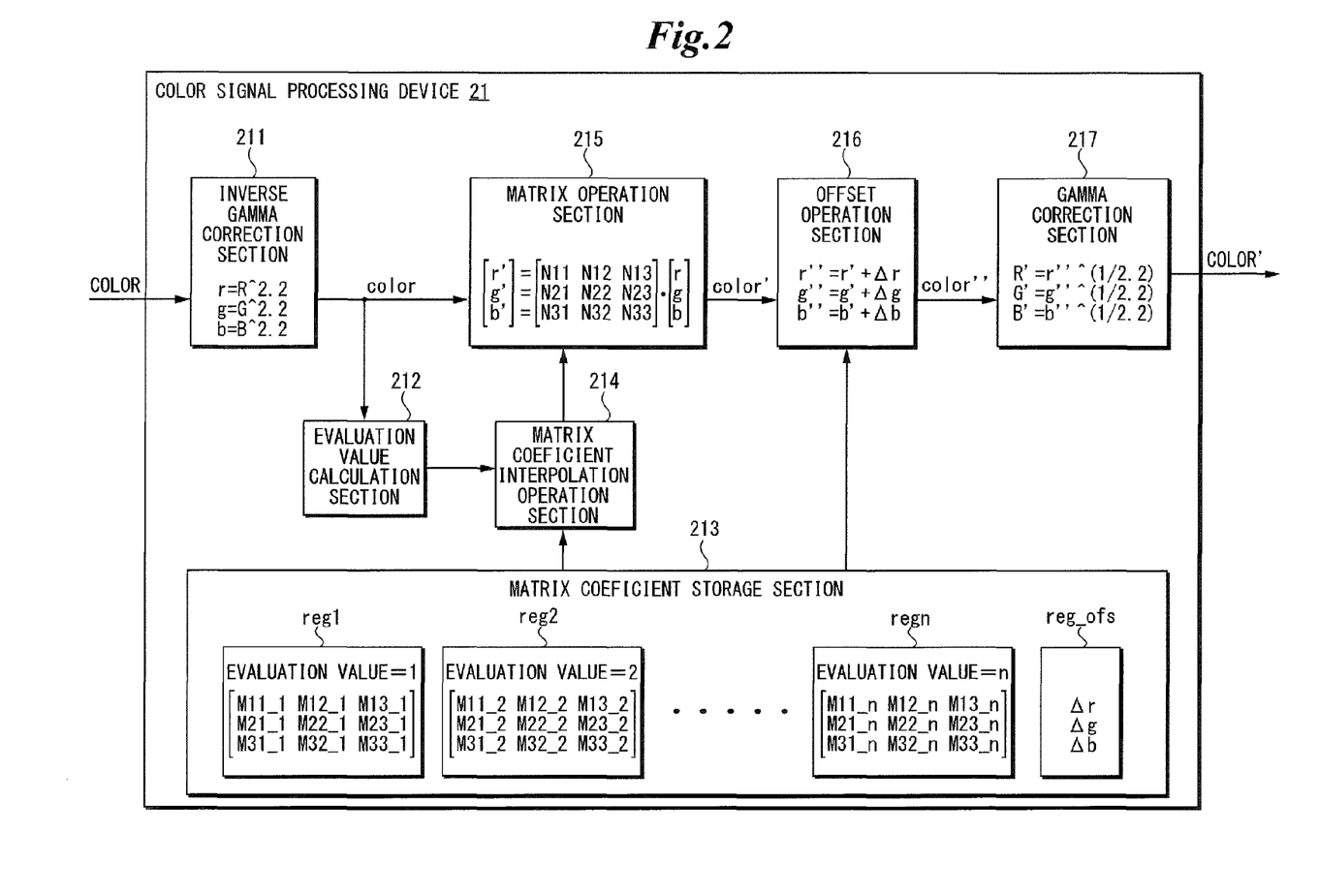
FIG. 2 shows an example of the configuration of a color signal processing device according to the embodiment of the present invention.

FIG. 2 shows an example of the configuration of the color signal processing device according to the embodiment of the present invention. The color signal processing device 21 according to the present embodiment may include, for example, an inverse gamma correction section 211, an evaluation value calculation section 212, a matrix coefficient storage section 213, a matrix coefficient interpolation operation section 214, a matrix operation section 215, an offset operation section 216, and gamma correction section 217, as shown in FIG. 2.

The inverse gamma correction section 211 may perform inverse gamma correction on the color signal COLOR transmitted from the video processing device 10 and output the signal having undergone the inverse gamma correction as a color signal color to the evaluation value calculation section 212 and the matrix operation section 215. Specifically, the inverse gamma correction section 211 may perform inverse gamma correction in accordance with the following Numerical Formula 2 on the color component signals R, G, and B of the colors in the color signal COLOR transmitted from the video processing device 10 to generate color component signals r, g, and b of the colors.

$$\begin{cases} r = R^{\wedge}2.2 \\ g = G^{\wedge}2.2 \\ b = B^{\wedge}2.2 \end{cases} \quad \text{[Formula 2]}$$

The inverse gamma correction section 211 may output the generated color signal color (i.e., general name of the color component signals r, g, and b of the colors) to the evaluation value calculation section 212 and the matrix operation section 215.

The evaluation value calculation section 212 may calculate the evaluation values VAL based on the color signal color outputted from the inverse gamma correction section 211 and output the calculated evaluation values VAL to the matrix coefficient interpolation operation section 214. Each of the evaluation values VAL may, for example, be lightness or luminance in the HSV or HLS color space but is not limited thereto and may be a value based on any other index or may be any value derived from a color component signal.

Specifically, when each of the evaluation values VAL is lightness in the HSV color space, the evaluation value calculation section 212 may calculate the evaluation value VAL in the form of the chromaticity of a signal having the greatest chromaticity in the color signal color outputted from the inverse gamma correction section 211 and output the calculated evaluation value VAL to the matrix coefficient interpolation operation section 214. As another example, when each of the evaluation values VAL is lightness in the HLS color space, the evaluation value calculation section 212 may calculate the evaluation value VAL in the form of the average of the chromaticity of a signal having the greatest chromaticity and the chromaticity of a signal having the smallest chromaticity in the color signal color outputted from the inverse gamma correction section 211 and output the calculated evaluation value VAL to the matrix coefficient interpolation operation section 214. As still another example, when each of the evaluation values VAL is luminance, the evaluation value calculation section 212 may calculate the evaluation value VAL based on the color signal color outputted from the inverse gamma correction section 211 and Numerical Formula 1 and output the calculated evaluation value VAL to the matrix coefficient interpolation operation section 214.

In the present example, the evaluation value calculation section 212 may calculate the evaluation values VAL based on the color signal color outputted from the inverse gamma correction section 211, but the present invention is not necessarily configured this way. When the image output device 20 is, for example, a printer, the evaluation value calculation section 212 may calculate the evaluation values VAL based on the color signal COLOR transmitted from the video processing device 10.

The matrix coefficient storage section 213 may store a 3×3 matrix coefficient M, which is used in the matrix coefficient interpolation operation section 214, for each predetermined evaluation value VAL and output the matrix coefficient M to the matrix coefficient interpolation operation section 214. Specifically, the matrix coefficient storage section 213 may have registers reg1 to regn, which correspond to the evaluation values VAL, and store the 3×3 matrix coefficients M to be used in the matrix coefficient interpolation operation section 214 in the registers reg1 to regn. The 3×3 matrix coefficients M stored in the matrix coefficient storage section 213 may be read by the matrix coefficient interpolation operation section 214. A matrix coefficient Mn, which is a matrix coefficient for an evaluation value VAL of n, is expressed, for example, by the following Numerical Formula 3:

$$Mn = \begin{bmatrix} M11\_n, M12\_n, M13\_n \\ M21\_n, M22\_n, M23\_n \\ M31\_n, M32\_n, M33\_n \end{bmatrix} \quad \text{[Formula 3]}$$

The matrix coefficient storage section 213 may further store the amounts of offset Δr, Δg, and Δb, which correspond to the signals of the colors to be used in the offset operation section 216, in a register reg_ofs. The matrix coefficient storage section 213 may output the stored amounts of offset Δr, Δg, and Δb to the offset operation section 216. The matrix coefficient storage section 213 may typically store the 3×3 matrix coefficients M, but the present invention is not necessarily configured this way. For example, when the color signal COLOR contains S color component signals, the matrix coefficient storage section 213 may store S×S matrix coefficients M. Further, the matrix coefficient storage section 213 may typically store the three amounts of offset Δr, Δg, and Δb, but the present invention is not necessarily configured this way. For example, when the color signal COLOR contains S color component signals, the matrix coefficient storage section 213 may store S amounts of offset.

The matrix coefficient interpolation operation section 214 may determine a matrix coefficient N based on the evaluation values VAL outputted from the evaluation value calculation section 212 and the matrix coefficients M1 to Mn stored in the matrix coefficient storage section 213. Specifically, the matrix coefficient interpolation operation section 214 evaluates whether or not a matrix coefficient M corresponding to any of the evaluation values VAL outputted from the evaluation value calculation section 212 is present in the matrix coefficient storage section 213. When a result of the evaluation shows that a matrix coefficient M corresponding to any of the evaluation values VAL outputted from the evaluation value calculation section 212 is present in the matrix coefficient storage section 213, the matrix coefficient interpolation operation section 214 may determine the matrix coefficient M to be the matrix coefficient N and output the matrix coefficient N to the matrix operation section 215.

On the other hand, when a result of the evaluation shows that a matrix coefficient M corresponding to any of the evaluation values VAL outputted from the evaluation value calculation section 212 is not present in the matrix coefficient storage section 213, the matrix coefficient interpolation operation section 214 may select a plurality of the registers reg having values close to the evaluation value VAL and perform interpolation operation on the plurality of matrix coefficients M stored in the selected registers reg to calculate the matrix coefficient N. The matrix coefficient interpolation operation section 214 may output the calculated matrix coefficient N to the matrix operation section 215. The matrix coefficient N may be typically calculated by using linear interpolation, but the present invention is not necessarily configured this way and may be calculated by using a polynomial, an exponential function, a trigonometric function, a combination thereof, or any of other variety of functions. The matrix coefficient N may be expressed by the following Numerical Formula 4:

$$N = \begin{bmatrix} N11, N12, N13 \\ N21, N22, N23 \\ N31, N32, N33 \end{bmatrix}$$ [Formula 4]

The matrix coefficient interpolation operation section 214 may typically determine a 3×3 matrix coefficient N, but the present invention is not necessarily configured this way and may determine an S×S matrix coefficient N when the color signal COLOR contains S color component signals.

The matrix operation section 215 may multiply the color signal color outputted from the inverse gamma correction section 211 by the matrix coefficient N calculated by the matrix coefficient interpolation operation section 214 and output a result of the multiplication as a color signal color' to the offset operation section 216. Specifically, the matrix operation section 215 may perform the operation expressed by the following Numerical Formula 5 on the color component signals r, g, and b of the colors in the color signal color outputted from the inverse gamma correction section 211 to generate color component signals r', g', and b' of the colors.

$$\begin{bmatrix} r' \\ g' \\ b' \end{bmatrix} = \begin{bmatrix} N11, N12, N13 \\ N21, N22, N23 \\ N31, N32, N33 \end{bmatrix} \cdot \begin{bmatrix} r \\ g \\ b \end{bmatrix}$$ [Formula 5]

The matrix operation section 215 may output the generated color signal color' (i.e., general name of the color component signals r', g', and b' of the colors) to the offset operation section 216.

In the present example, the matrix operation section 215 may multiply the color signal color outputted from the inverse gamma correction section 211 by the matrix coefficient N and output a result of the multiplication as the color signal color' to the offset operation section 216, but the present invention is not necessarily configured this way. When the image output device 20 is, for example, a printer, the matrix operation section 215 may multiply the color signal COLOR transmitted from the video processing device 10 by the matrix coefficient N and output a result of the multiplication directly to the output section 22.

The offset operation section 216 may add the amounts of offset Δr, Δg, and Δb read from the matrix coefficient storage section 213 to the color signal color' outputted from the matrix operation section 215 and output a result of the addition as a color signal color" to the gamma correction section 217. Specifically, the offset operation section 216 may perform the operation expressed by the following Numerical Formula 6 on the color component signals r', g', and b' of the colors in the color signal outputted from the matrix operation section 215 to generate color component signals r", g", and b" of the colors.

$$\begin{cases} r'' = r' + \Delta r \\ g'' = g' + \Delta g \\ b'' = b' + \Delta b \end{cases}$$ [Formula 6]

In Numerical Formula 6, Δr, Δg, and Δb may represent predetermined amounts of offset corresponding to the red, green, and blue signals. The offset operation section 216 may output the generated color signal color" (i.e., general name of the color component signals r", g", and b" of the colors) to the gamma correction section 217.

The gamma correction section 217 may perform gamma correction on the color signal color" outputted from the offset operation section 216 and output the corrected color signal as the output signal COLOR' to the output section 22. Specifically, the gamma correction section 217 may perform the operation expressed by the following Numerical Formula 7 on the color component signals r", g", and b" of the colors in the color signal color" outputted from the offset operation section 216.

$$\begin{cases} R' = r''^{\wedge 1/2.2} \\ G' = g''^{\wedge 1/2.2} \\ B = b''^{\wedge 1/2.2} \end{cases}$$ [Formula 7]

The gamma correction section 217 may output the generated output signal COLOR' (i.e., general name of the color component signals R', G', and B' of the colors) to the output section 22.

The thus configured color signal processing device 21 may store an arbitrary number of 3×3 matrix coefficients M corresponding to the evaluation values VAL of the color signal COLOR transmitted from the video processing device 10. The color signal processing device 21 may calculate the evaluation values VAL from the color signal COLOR transmitted from the video processing device 10 and calculate the matrix coefficient N based on the matrix coefficient M corresponding to any of the evaluation values VAL. The color signal processing device 21 may subsequently multiply the color signal color, which is the color signal COLOR having undergone inverse gamma correction, by the calculated matrix coefficient N, add predetermined amounts of offset to a result of the multiplication, perform gamma correction on a result of the addition, and output a result of the gamma correction as the output signal COLOR'. The color signal processing device 21 can thus correct color phase distortion for each luminance value by using a small-capacity memory that stores an arbitrary number of 3×3 matrix coefficients M and predetermined amounts of offset Δr, Δg, and Δb and in a circuit configuration having a small chip area and low power consumption.

Figure 3A:
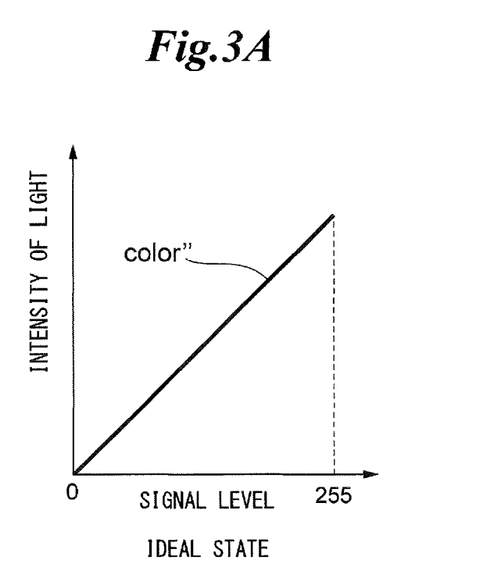
FIGS. 3A to 3D show the action of an offset operation section in the color signal processing device according to the embodiment of the present invention.

FIGS. 3A to 3D show in detail the action of the offset operation section in the color signal processing device according to the embodiment of the present invention. The image output device 20 may be a display in FIGS. 3A to 3D. FIG. 3A shows the relationship between the chromaticity of the signal of each of the colors in the color signal color'' and the actual intensity of the light outputted by the output section 22 in a case where the output section 22 has ideal output characteristics. In the case where the output section 22 has ideal output characteristics, the output section 22 may output light having intensity proportional to the magnitude of the chromaticity of the color signal color'', as shown in FIG. 3A.

Figure 3B:
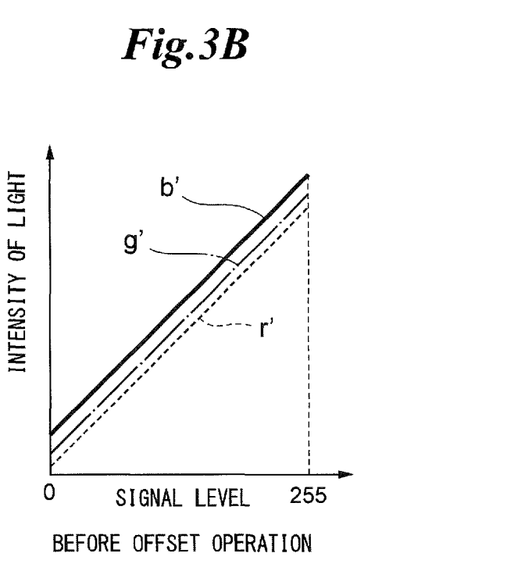

FIG. 3B shows the relationship between the chromaticity of the signal of each of the colors in the color signal color'' and the actual intensity of the light outputted by the output section 22 in a case where the output section 22 does not have ideal output characteristics. In the case where the output section 22 does not have ideal output characteristics, the output section 22 may add an offset according to the signal of each of the colors in the color signal color'' to the intensity of the light of the color and output the resultant light, as shown in FIG. 3B. The value of the offset added by the output section 22 to the intensity of the light of each of the colors may depend on luminance leakage characteristics when the output section 22 is a liquid crystal panel.

Figure 3C:
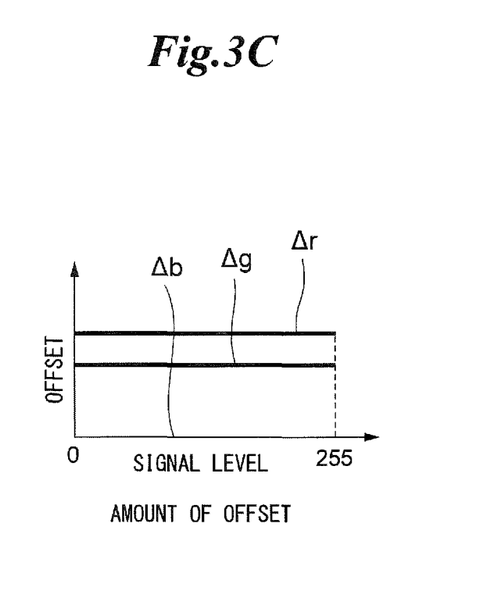

FIG. 3C shows the amount of offset to be added by the offset operation section 216 to the signal of each of the colors. The offset operation section 216 may add the amounts of offset Δr, Δg, and Δb to the color component signals r', g', and b' of the colors in such a way that the luminance leakage characteristics of the output section 22 are canceled, as shown in FIG. 3C.

Figure 3D:
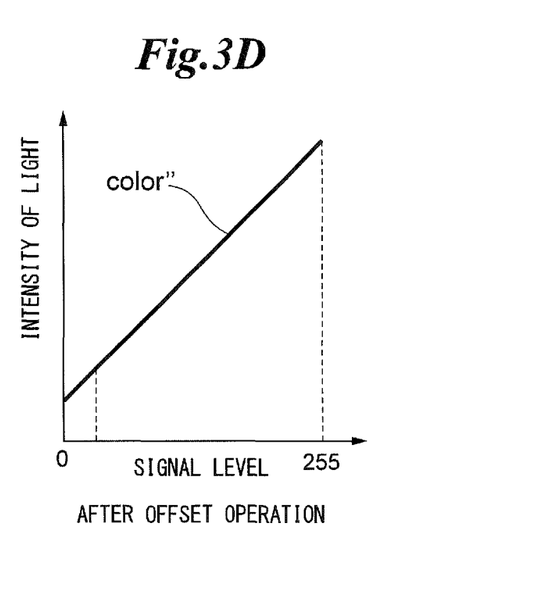

FIG. 3D shows the relationship between the chromaticity of the signal of each of the colors in the color signal color'' after the offset operation section 216 performs the offset operation and the actual intensity of the light outputted by the output section 22. The output section 22 may output the color component signals r'', g'', and b'' of the colors based on the same output characteristics obtained by the offset operation performed by the offset operation section 216, as shown in FIG. 3D.

Figure 4:
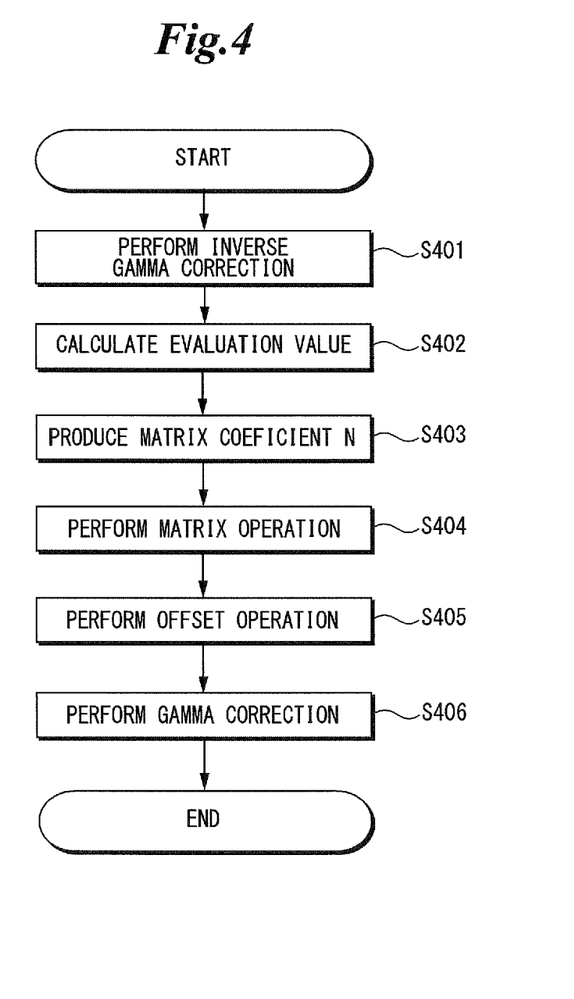
FIG. 4 is a flowchart showing an example of the action of the color signal processing device according to the embodiment of the present invention.

FIG. 4 is a flowchart showing an example of the action of the color signal processing device according to the embodiment of the present invention. Referring to FIG. 4, the color signal processing device 21 may first perform inverse gamma correction on the color signal COLOR transmitted from the video processing device 10 to generate the color signal color (S401).

The color signal processing device 21 may then calculate the evaluation values VAL based on the color component signals of the colors in the generated color signal color (S402). The color signal processing device 21 may output the calculated evaluation values VAL to the matrix coefficient interpolation operation section 214. The color signal processing device 21 may generate the matrix coefficient N based on the matrix coefficients M stored in the matrix coefficient storage section 213 and the evaluation values VAL calculated by the evaluation value calculation section 212 (S403). The color signal processing device 21 may output the generated matrix coefficient N to the matrix operation section 215.

The color signal processing device 21 may multiply the color signal color generated by the inverse gamma correction section 211 by the matrix coefficient N generated by the matrix coefficient interpolation operation section 214 to perform matrix operation (S404). The color signal processing device 21 may output a result of the operation as the color signal color' to the offset operation section 216.

The color signal processing device 21 may add the amounts of offset Δr, Δg, and Δb stored in the matrix coefficient storage section 213 to the generated color signal color' to perform offset operation (S405). The color signal processing device 21 may output a result of the operation as the color signal color'' to the gamma correction section 217.

The color signal processing device 21 may perform gamma correction on the generated color signal color'' to generate the output signal COLOR'' (S406) and output the generated output signal COLOR' to the output section 22.

As described above, the color signal processing device 21 may store an arbitrary number of 3×3 matrix coefficients M corresponding to the evaluation values VAL of the color signal COLOR transmitted from the video processing device 10. The color signal processing device 21 may calculate the evaluation values VAL from the color signal COLOR transmitted from the video processing device 10 and calculate the matrix coefficient N based on the matrix coefficient M corresponding to any of the evaluation values VAL. The color signal processing device 21 may multiply the color signal color, which is the color signal COLOR having undergone the inverse gamma correction, by the calculated matrix coefficient N, add predetermined amounts of offset to a result of the multiplication, and perform gamma correction on a result of the addition, and output a result of the gamma correction as the output signal COLOR'. The color signal processing device 21 can thus correct color phase distortion for each luminance value by using a small-capacity memory that only stores an arbitrary number of 3×3 matrix coefficients M and predetermined amounts of offset Δr, Δg, and Δb and in a circuit configuration having a small chip area and low power consumption.

Figure 5A:
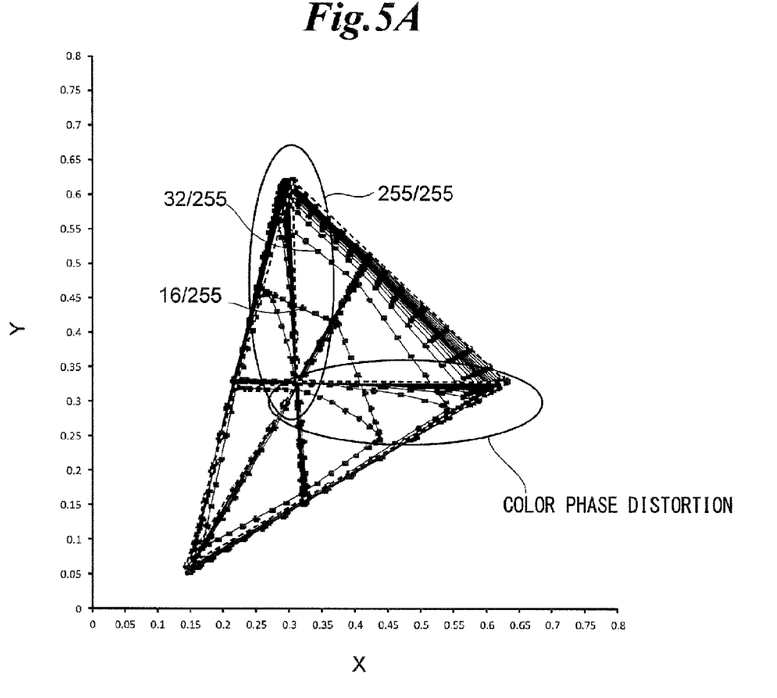
FIGS. 5A and 5B are xy chromaticity diagrams showing the color phase of light outputted by the image output system according to the embodiment of the present invention.
Figure 5B:
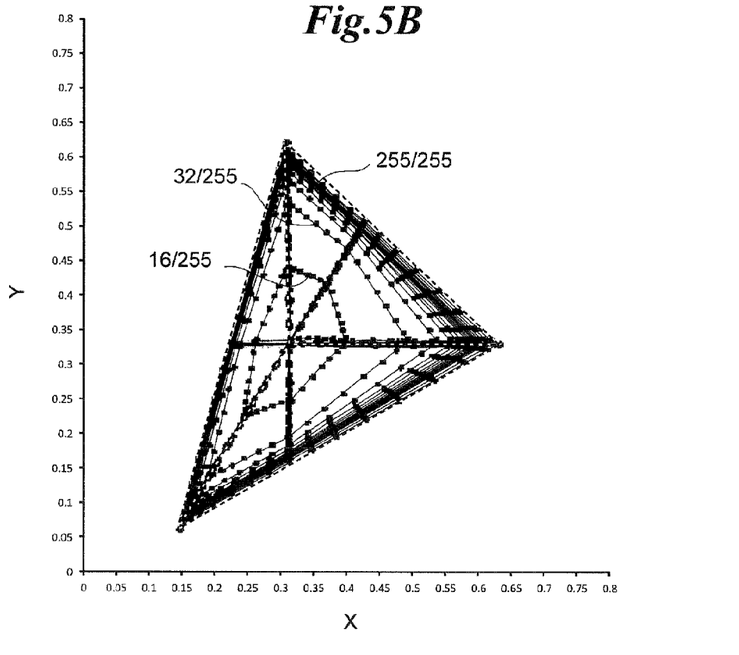

FIGS. 5A and 5B are xy chromaticity diagrams showing the color phase of the light outputted by the image output system according to the embodiment of the present invention. In FIGS. 5A and 5B, the image output device 20 may be a display. FIG. 5A shows the color phase of the light outputted by the output section 22 in a case where the chromaticity conversion performed by the image output system 1 according to the present embodiment is not performed. In the case where the image output system 1 according to the present embodiment is not used to perform the chromaticity conversion, the output section 22 may output light with the color phase distorted as a whole toward blue, as shown in FIG. 5A.

FIG. 5B shows the color phase of the light outputted by the output section 22 in the case where the chromaticity conversion performed by the image output system 1 according to the present embodiment is performed. In the case where the image output system 1 according to the present embodiment is used to perform the chromaticity conversion, the output section 22 may output light after the color phase distorted toward blue in FIG. 5A is corrected to a normal color phase, as shown in FIG. 5B.

The embodiments described above have been presented by way of example to describe the present invention, and it is not intended to limit the present invention only to the embodiments. The present invention can be implemented in a variety of other forms to the extent that they do not depart from the substance of the present invention.

For example, in the method disclosed in the present specification, the steps, actions, or functions may be performed concurrently or in different orders as long as results thereof cause no contradiction. The steps, actions, and functions described above have been provided only by way of example, and some of the steps, actions, and functions can be omitted or combined with each other into a single step, action, or function, or other steps, actions, or functions may be added to the extent that the omission, combination, and addition do not depart from the substance of the present invention.

Further, in the present specification, in which a variety of embodiments have been disclosed, a specific feature (technical item) in an embodiment can be improved as appropriate and the improved feature can be added to another embodiment or can replace a specific feature in the another embodiment. These forms also fall within the substance of the present invention.

The present invention can be widely applied to a field of a device including an image output device and an image communication interface.

What is claimed is:

1. A color signal processing device comprising:
    a storage section that stores a plurality of first matrix coefficients corresponding to a plurality of evaluation values and a predetermined offset value relating to an output characteristic of an output device;
    an evaluation value calculation section that calculates a predetermined evaluation value based on each of a plurality of color component signals contained in a first color signal;
    a matrix coefficient interpolation operation section that generates a second matrix coefficient based on the predetermined evaluation value calculated by the evaluation value calculation section and the plurality of first matrix coefficients stored in the storage section without using the predetermined offset value;
    a matrix operation section that performs an operation of the second matrix coefficient on each of the color component signals in the first color signal to generate a second color signal containing a plurality of color component signals; and
    an offset operation section that performs an operation of the predetermined offset value stored in the storage section on each of the second color signals.

2. The color signal processing device according to claim 1, further comprising:
    an inverse gamma correction section that performs inverse gamma correction on a color signal outputted from a video processing device to generate the first color signal; and
    a gamma correction section that performs gamma correction on the second color signal on which the operation has been performed.

3. The color signal processing device according to claim 1, wherein the evaluation value calculation section calculates the evaluation value based on a signal level of a color component signal having a highest signal level in the first color signal.

4. The color signal processing device according to claim 2, further comprising an output section that outputs an image based on the second color signal having undergone the gamma correction.

5. The color signal processing device according to claim 1, wherein the matrix coefficient interpolation operation section selects, from among the plurality of first matrix coefficients, a specific first matrix coefficient which corresponds to the predetermined evaluation value calculated by the evaluation value calculation section as the second matrix coefficient if the specific first matrix coefficient which corresponds to the predetermined evaluation value exists in the storage section.

6. The color signal processing device according to claim 1, wherein the matrix coefficient interpolation operation section generates the second matrix coefficient based on specific first matrix coefficients among the plurality of first matrix coefficients if there is no first matrix coefficient which corresponds to the predetermined evaluation value existing in the storage section, the specific first matrix coefficients corresponding to a plurality of evaluation values associated to the predetermined evaluation value calculated by the evaluation value calculation section.

7. The color signal processing device according to claim 6, wherein the matrix coefficient interpolation operation section generates the second matrix coefficient by performing linear interpolation on specific first matrix coefficients among the plurality of first matrix coefficients, the specific matrix coefficients corresponding to a plurality of evaluation values associated to the predetermined evaluation value calculated by the evaluation value calculation section.

8. A method for processing a color signal in a color signal processing device, the method comprising:
    storing a plurality of first matrix coefficients corresponding to a plurality of evaluation values in a storage section and a predetermined offset value relating to an output characteristic;
    calculating a predetermined evaluation value based on each of a plurality of color component signals contained in a first color signal;
    generating a second matrix coefficient based on the calculated predetermined evaluation value and the first matrix coefficients stored in the storage section without using the predetermined offset value;
    performing an operation of the second matrix coefficient on the first color signal to generate a second color signal containing a plurality of color component signals; and
    performing an operation based on the predetermined offset value stored in the storage section and the second color signal.

9. The method for processing a color signal according to claim 8, further comprising:
    performing inverse gamma correction on a color signal outputted from a video processing device to generate the first color signal; and
    performing gamma correction on the second color signal.

10. The method for processing a color signal according to claim 9, further comprising outputting an image based on the second color signal having undergone the gamma correction.

11. The method for processing a color signal according to claim 8, wherein the calculating the evaluation value includes calculating the evaluation value based on a signal level of a color component signal having a highest signal level in the first color signal.

12. The method for processing a color signal according to claim 8, wherein the producing the second matrix coefficient includes selecting, from the plurality of first matrix coefficients, a specific first matrix coefficient which corresponds to the predetermined evaluation value as the second matrix coefficient if the specific first matrix coefficient which corresponds to the predetermined evaluation value exists in the storage section.

13. The method for processing a color signal according to claim 8, wherein the generating the second matrix coefficient includes generating the second matrix coefficient based on specific first matrix coefficients among the plurality of first matrix coefficients, if there is no first matrix coefficient which corresponds to the predetermined evaluation value existing in the storage section, the specific matrix coefficients corresponding to a plurality of evaluation values associated to the predetermined evaluation value.

14. The method for processing a color signal according to claim 13, wherein the producing the second matrix coefficient includes generating the second matrix coefficient by performing linear interpolation on specific first matrix coefficients among the plurality of first matrix coefficients, if there is no first matrix coefficient which corresponds to the predetermined evaluation value existing in the storage section, the specific matrix coefficients corresponding to a plurality of evaluation values associated to the predetermined evaluation value.

* * * * *